United States Patent Office 3,725,240
Patented Apr. 3, 1973

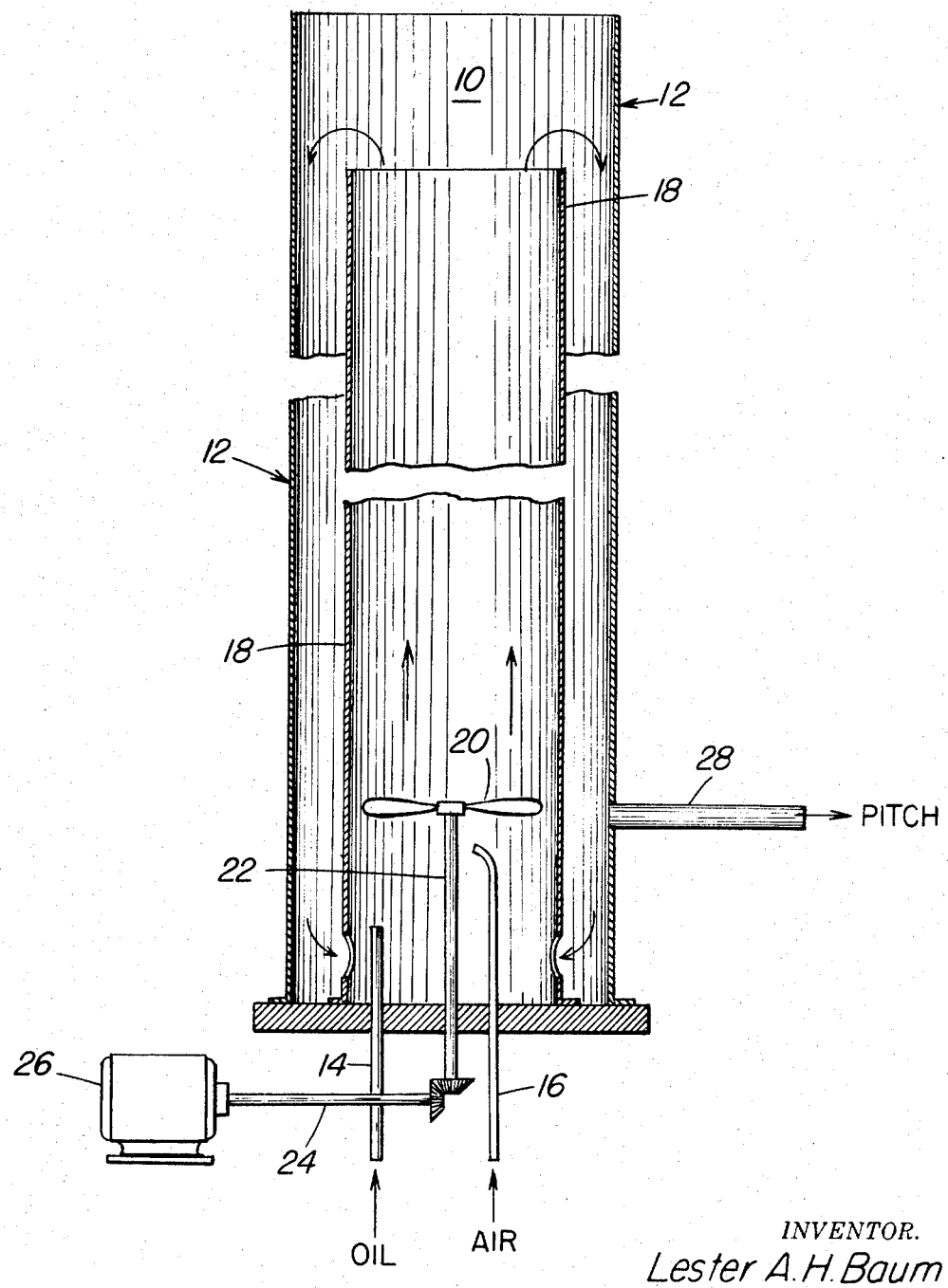

3,725,240
PROCESS FOR PRODUCING ELECTRODE
BINDER ASPHALT
Lester A. H. Baum, Cherry Hill, N.J., assignor to
Mobil Oil Corporation
Continuation-in-part of application Ser. No. 57,777, July 23, 1970, which is a continuation-in-part of application Ser. No. 777,157, Nov. 19, 1968, and a continuation-in-part of application Ser. No. 57,825, July 23, 1970, which is a continuation-in-part of said application Ser. No. 777,157, all now abandoned. This application May 13, 1971, Ser. No. 143,063
Int. Cl. C10c 3/04; C10g 37/04
U.S. Cl. 208—76            8 Claims

ABSTRACT OF THE DISCLOSURE

Asphaltic compositions suitable for use as binders for carbon electrodes can be prepared by a continuous process of polymerization from a feed stock comprising a high boiling oil portion of the product obtained from catalytic cracking of petroleum gas oils, provided that portion (cycle stock) is further cracked in the absence of catalyst and fractionated to remove light ends. A suitable polymerization is conducted in the presence of air at a rate from about 6 to about 30 standard cubic feet of air per minute per barrel of liquid, at a temperature from about 750° F. to about 850° F., and for a period not exceeding one hour to produce an asphaltic composition of increased specific gravity and suitable for the aforementioned use as carbon electrode binders.

CROSS-REFERENCE TO RELATED APPLICATIONS

Continuation-in-part of Ser. No. 57,777, filed July 23, 1970 which, in turn, is a continuation-in-part of application Ser. No. 777,157, filed Nov. 19, 1968; and also a continuation-in-part of application Ser. No. 57,825, filed July 23, 1970 which, in turn, is a continuation-in-part of application Ser. No. 777,157, filed Nov. 19, 1968 all abandoned.

BACKGROUND OF THE INVENTION

(1) Field of the invention

This invention, which is a continuation-in-part of my application Ser. No. 57,777, filed July 23, 1970 which, in turn, is a continuation-in-part of application Ser. No. 777,157, filed Nov. 19, 1968; and also a continuation-in-part of application, Ser. No. 57,825, filed July 23, 1970, which, in turn, is a continuation-in-part of application Ser. No. 777,157, filed Nov. 19, 1968, relates to the manufacture of improved asphaltic compositions from catalytic cycle stock, which asphalts are suitable for use as binders in the manufacture of molded carbon electrodes.

(2) Description of the prior art

In the manufacture of molded carbonaceous materials, such as the aforementioned carbon electrodes, calcined coke is generally employed as the starting material. Inasmuch as the coke possesses no natural adhesiveness, it must be bound together, in the desired shape, with a compatible material. Thus, for example, in the manufacture of carbon electrodes, the coke is usually ground, mixed with a binder, molded and then baked to carbonize the binder. Binders employed for these purposes, must be sufficiently fluid at the temperatures at which they are mixed with the solid coke in order to completely wet and penetrate the latter. Furthermore, the binder should be relatively stable when subjected to temperatures as high as about 200° C. By reason of these stringent requirements, commercially employed pitch binders have been made, almost exclusively, from selected coal-tar products.

Binders, employed in the production of molded carbonaceous articles, particularly carbon electrodes, should, in general, comprise a stable hydrocarbon mixture of uniform consistency and quality, and should be substantially free from contaminants. Among the contaminants which have heretofore prevented the use of petroleum-derived pitch in carbonaceous articles, are coke-like materials. The term "coke" or "coke-like materials," as employed herein, denotes a hydrocarbon having a carbon to hydrogen atomic ratio of about 2.0 or higher, and is, generally, produced as a result of excessive polymerization and condensation reactions, which are necessary for obtaining a pitch binder having the desired properties. A satisfactory pitch binder, suitable for use in the manufacture of carbon electrodes, can hold in stable suspension only about 2.5 weight percent of coke-like materials. At coke concentrations greater than about 2.5 weight percent, it is found that the excess coke-like material tends to agglomerate and to separate from the pitch, producing a non-uniform product, and providing a non-uniform binder. This coke-like material has been found to have poor binding properties, and does not contribute to the desired characteristics of the finished product. The presence of excess coke in petroleum-derived pitch, therefore, is one of the main factors in decreasing bonding characteristics, of the binder pitch, resulting in migration during baking treatment of carbon electrodes, and leaving areas of unbonded carbon in the finished article. In this condition, a carbon electrode, employing a petroleum pitch binder, is produced having uneven mechanical strength, and is variable in conductivity. For these reasons, petroleum pitches have heretofore not been considered as satisfactory binders, since they fail to meet the stringent requirements of commercially desirable pitch binders. Thus, commercial pitch binders have heretofore been produced, almost exclusively, from coal tar. Moreover, in some applications, the presence of excessive sulfur in the aforementioned electrodes, causes deleterious effects during ore reduction. The low sulfur-content of the charge-stock employed in the present invention is another advantage to be realized.

Methods contemplated by the prior art for preparing a pitch binder from petroleum-derived hydrocarbons, include thermally cracking a high-boiling hydrocarbon fraction, and passing the hot cycle residue into a soaking tank of substantial capacity. The flow of the cycle residue is regulated through the soaking tank, so that the residence time for any given increment of feed-stock ranges from about 3 to about 5 hours. The initial pitch thus produced is not considered satisfactory and is recycled through the soaking tank to improve its quality. However, over an extended soaking time period, an excessive amount of coke-like material is produced in the upgrading of the pitch product, while some of the excess coke separates and tends to accumulate at the bottom of the soaking tank. This condition, therefore, requires an extensive cleaning operation to remove undesired accumulated coke. In addition, the excess coke thus produced, contaminates the pitch product and provides the undesirable characteristics of a non-uniform pitch binder, as hereinbefore described. Furthermore, the extended soaking operation of the prior art, as employed on a commercial basis, is found to be time consuming and expensive for improving the quality of the pitch binder.

In another aspect it was found that because the coke from coal tar pitch is more reactive than the petroleum coke, it is selectively oxidized in the cell, in the manufacture of aluminum, thus removing the bond and permitting the loss of some of the coke aggregate. In laboratory studies involving samples of coal tar pitch from various sources, it has been demonstrated that the degree of crystallinity of the coke from pitch binder, as determined by X-ray defraction, is a measure of the reactivity of the coke in the reduction cell. Thus, it is found that the coke produced from the coal tar pitch binder has a lower degree of crystallinity than the petroleum coke aggregate and is selectively oxidized from the anode.

Despite this deficiency, coal tar pitches are the materials used commercially, while petroleum pitch, prepared by economically feasible techniques, have been found unsuitable for use in electrodes such as those employed in the manufacture of aluminum. In this respect, in contrast to coke made from coal tar pitch, cokes prepared from petroleum base binders are found to have a high degree of crystallinity, thus reducing the selective oxidation of the bonding coke with its attendant loss of coke aggregate.

SUMMARY OF THE INVENTION

In accordance with the present invention, as more fully hereinafter described, an improved process is provided for conversion to pitch suited for use as binder for electrode coke of high boiling components from the catalytic cracking of petroleum gas oil at a temperature above 750° F. in the presence of a solid porous cracking catalyst, including the steps which comprise, fractionating the effluent of the cracking operation to separate therefrom a cycle stock boiling predominately above about 550° F.; cracking the cycle stock at elevated temperature in the absence of a cracking catalyst for a time such that the portion of the resultant vis-broken cycle stock boiling above 750° F. has a saturates content not higher than about 12% by weight, as determined by chromatographic analysis; fractionating the vis-broken cycle stock to provide a bottoms fraction thereof boiling above about 700° F. to 850° F.; continuously feeding the aforementioned bottoms fraction to a continuous blowing operation maintained at about 750° F. to 850° F.; introducing air to a lower portion of the liquid subjected to the blowing operation at a rate from about 6 to about 30 standard cubic feet per minute per barrel; continuously withdrawing blown pitch from said continuous blowing operation at a rate to maintain an average residence time of liquid therein less than one hour; and stripping light ends from the blown pitch by steam distillation, whereby there is produced a pitch which, on calcining, yields a coke of high crystallinity.

Binder pitch has heretofore been produced by heat-soaking of the aforementioned thermal asphalts for relatively long periods of time (e.g., up to 5 hours) at temperatures of the order of about 800° F., on a batch basis, or a continuous basis, by carrying out the heat operation for relatively shorter periods, but at relatively higher temperatures, e.g., of the order of about 975° F. On a comparative basis, the asphaltic compositions of the present invention are prepared by carrying out the heat treatment in the presence of air or other oxygen source. This introduction of oxygen into the reaction, results in a polymerization mechanism, in which the oxygen reacts with hydrogen present in the asphalt, to produce water, and adds heat values to the system at a molecular level, where it is most beneficial, and also results in removing undesirable reaction products. In essence, the ability to utilize oxygen in the heat treatment, makes possible the utilization of significantly lower heat-soaking temperatures, namely, below the carbonizing temperature of the asphalt (which is about 850° F.), than have heretofore been employed in conventional heat-soaking operations, where the thermal asphalt was heat-soaked at temperatures in excess of about 1000° F., and even as high as of the order of about 1100° F., but in the absence of oxygen. In accordance with the present process, the aforementioned polymerization treatment results in upgrading a petroleum asphalt, for example those having a specific gravity of at least about 1.0 to asphalts of significantly higher, and far more desirable, specific gravities, for example of the order of about 1.24.

The aforementioned cycle stock, subjected to vis-breaking and subsequent air-blowing of the separator bottoms fraction therefrom, may comprise cycle stocks obtained from Fluid Catalytic Cracking (FCC) operations or Thermofor Catalytic Cracking (TCC) operations. In the FCC operation, in general, preheated gas oil is charged to a reactor inlet line, where it picks up finely divided (e.g. 100 mesh) regenerated catalyst from the regenerator-catalyst standpipe and carries it into the reactor. Sensible heat of the gas oil charge plus sensible heat of hot catalyst from regeneration at temperatures upwards of 1200° F. supply sufficient heat that the endothermic cracking reaction is sustained at a desired temperature. The upward flow of hydrocarbons in the FCC reactor is adjusted to maintain a fluidized bed of the finely divided catalyst, promoting contact between catalyst and charge. In a typical operation for preparing charge material for this invention, California heavy gas oil (650° F.–1000° F.) is converted over a zeolite catalyst such as that described in Pat. 3,140,249 in an FCC operation at 950–975° F., a weight hourly space velocity of 11 and catalyst to oil ratio of 8. Reaction products are then passed into a distillation column, in the bottom section of which they are quenched to about 600° F. to condense the heaviest hydrocarbons. Quenching is accomplished by circulating heavy condensate through a cooler and then back through the bottoms section of the column, and the circulating condensate scrubs catalyst fines out of the up-flowing reaction products. The catalyst slurry so produced is sent to a settler to concentrate the catalyst, the concentrated bottoms being returned to the reactor. The oil separated from the concentrated bottoms, hereinafter "clarified oil," is basic raw material for the process of this invention.

In the TCC operation, catalyst pellets of one-sixteenth inch diameter move downwardly through the reactor as a compact bed. In most modern TCC units, flow of gas oil charge is concurrent with catalyst flow in the reactor. As in FCC, heat of endothermic reaction is supplied by sensible heat of gas oil charge and catalyst. Charging wide cut gas oil (400–1000° F.) from mixed Canadian crudes and using a catalyst such as that described in U.S. Pat. 3,140,249 at 875–925° F. liquid hourly space velocity of 2 and catalyst to oil ratio of 5, the reactor effluent is fractionated to provide a bottoms fraction (syntower bottoms) suited to processing according to this invention.

The catalytic cycle stock derived from either FCC or TCC as described above will have an initial boiling point determined by the nature of the refinery operation, generally determined by factors other than manufacture of binder pitch. If the fractionation be so conducted as to provide a cycle stock of low initial boiling point, as in operations for maximum gasoline, the cycle stock may be refractionated apart from the main fractionation of the cracking unit. In general, the cycle stock processed according to this invention will boil above about 550° F., the higher the better, up to about 750° F. initial boiling point.

Such cycle stocks may have a content of saturated hydrocarbons in the range of 30% to 40% by weight as determined by chromatographic analysis. The next step in the operation is vis-breaking (mild thermal cracking) to reduce saturates content below 12 weight percent, preferably below 10%, for example 5 wt. percent. In a typical vis-breaking operation, TCC cycle stock from catalytic cracking of Canadian gas oil, as described above, was topped to 750° F. and cracked in a heated coil at 580° F. coil inlet temperature, 873° F., coil outlet, 400 p.s.i.g. and 5.8 minutes residence time at a 2 to 1 recycle rate. The raw cycle stock before vis-breaking had a gravity of 9° API and contained 35 wt. percent saturates. The products of vis-breaking were as follows, in weight percent:

| | |
|---|---|
| Dry gas | 1.2 |
| $C_4$ | 0.5 |
| $C_5$—380° F. gasoline | 6.9 |
| 380° F.–750° F. gas oil | 30.5 |
| 750° F.+bottoms | 60.9 |

The 750° F. bottoms product obtained by distillation of the vis-broken cycle stock had a specific gravity of 1.1442 and saturates content of 9.8 wt. percent.

Vis-broken cycle stocks, topped to 700° F. to 850° F., preferably 750° F. to 800° F. are suitable charge to the air blowing polymerization constituting the final step in conversion according to this invention. Light products resulting from vis-breaking do not adversely affect chemistry of the air-blowing polymerization, but they occupy space in the blowing reactor and are distilled therefrom in any event to the extent present in the charge to this vessel.

The polymerization reaction is preferably conducted above atmospheric pressure. This use of elevated pressure has been found to result in greatly increased pitch yields. Thus for example, it has been found that pitch yields of from about 40 to about 75 percent of the feed stock, where the polymerization is conducted at atmospheric pressure, are increased to yields of from about 87 to about 92 percent, depending upon the particular charge stock treated. Furthermore, it was found that the quality of the pitch, as judged by the beta resin content of products produced at atmospheric pressure were from about 10 to about 25 percent, compared with values from about 25 to about 35 percent for products produced at above-atmospheric pressures. Thus, many asphalt stocks which are unsuitable for improvement by processing at atmospheric pressure, respond to improvement by processing at above-atmospheric pressure under the above-described polymerization conditions. Excessively high pressures, above about 60 p.s.i.g. measured in the vapor space above the liquid, are undesirable because of retention of light hydrocarbons and increased tendency to coke formation.

The above-described conditions of air-blowing rate, polymerization temperature, pressure and residence time, for conducting the polymerization reaction in producing the asphaltic compositions of the present invention represent a combination of critical operating ranges. More specifically, as hereinbefore indicated, the polymerization is conducted in the presence of air at a rate from about 6 to about 30 standard cubic feet per minute per barrel and preferably from about 10 to about 20 standard cubic feet per minute per barrel. In this respect it is found that if the air-blowing step is conducted below about 6 standard cubic feet per minute per barrel, the blowing time is unnecessarily extended to such a degree that undesirable coke formation occurs. On the other hand, if the air-blowing is conducted above about 30 standard cubic feet per minute per barrel, the presence of excess air results in a mechanical carryover in which the feed stock is carried into the overhead of the polymerization reactor and thus affords no significant degree of the desired polymerization.

In another critical aspect, as hereinbefore indicated, the polymerization is conducted at a temperature from about 700° F. to about 850° F. In this respect it is found that if the temperature is maintained below about 700° F., poor polymerization takes place, an undesirable product of high viscosity is produced and, in general, deterioration of product quality results. On the other hand, it is found that if the polymerization treatment is conducted above 850° F., an excessive degree of vaporization of the feed stock occurs and the feed stock tends to pass into the overhead as a vapor. It is also found that increased coking occurs at such elevated temperatures.

In a further critical aspect, as hereinbefore indicated, the polymerization treatment is conducted at atmospheric or higher pressures and, preferably from about 0 to about 15 p.s.i.g. In this respect it is found that if the polymerization is conducted below atmospheric pressure a vacuum tends to be created to such degree that the feed stock is carried into the overhead and does not undergo reaction.

In still another critical aspect, as hereinbefore indicated, the polymerization treatment is carried out for a period not exceeding about 1 hour. In this respect it has been found that if the polymerization treatment exceeds about 1 hour, undesirable coke formation occurs and thus results in a poor quality electrode binder pitch.

As hereinbefore described, the feed stock employed in the polymerization reaction, comprises, in general, a relatively high boiling fraction derived from catalytic cracking cycle stocks, which are thermally processed (vis-broken) to produce smaller molecules by the removal of naphthenes and paraffins, leaving behind aromatic compounds with reduced side-chains. In general, the most desirable feed stocks for binder production are associated with low saturates content, low-mono-, di-, and polynuclear aromatic oil content and, also, high total resin content. In many instances topping of the feed stock tends to minimize coke formation in the air-blowing operation, reduce vapor load in the blowing still and to have no significant effect on pitch yield. Particularly preferred feed stocks are those having a specific gravity of from about 1.08 to about 1.16 and a maximum saturates content not higher than 12% by weight, as determined by chromatographic analysis by the procedure set forth in "An Absorption Method for Characterizing Asphalts," April 1958—Preprints of the American Chemical Society.

As hereinbefore described, the thermal processing of the hydrocarbon feed stock material in the presence of air, or other oxygen sources, is carried out at a temperature in the range from about 700° F. to about 850° F. and preferably from about 750° F. to about 800° F. In this respect, it is found that increasing the temperature above about 750° F., results in an increase of the specific gravity level, but at a much faster rate. On the other hand, it is found that increasing the temperature above about 750° F. has very little effect on the benzene-insolubles fraction of the product and remains essentially constant, particularly at processing temperatures between about 750° F. and about 780° F. The sulfur level of the product does not appear to differ appreciably from that of the charge-stock.

In accordance with the aforementioned thermal treatment, it was found that as the softening point of the pitch increases, the specific gravity also increases at approximately a linear rate. The smallest increase was found to occur when the products are made by distillation. The greatest increase, on the other hand, was found to have been obtained at the highest blowing temperature. Thus, it was found that as the temperature increases, the specific gravity increases at an accelerating rate. Below about 700° F., the increase in specific gravity per 1° F. increase in softening point, occurs at a relatively slow rate. Above about 700° F., this increase occurs at a much faster rate. Illustratively, based on the specific gravity requirements of the binder pitch, it was found that a minimum temperature of about 750° F. is required to produce a 230/240° F. softening point binder pitch. It will thus be noted that an important feature of the present invention resides in so conducting the oxidation and polymerization of the charge stock with a reduced rate of distillation taking place. Such distillation is controlled by applying sufficient pressure (at the desired temperature) that the charge stock remains as a liquid while being oxidized and polymerized below the distillation temperature.

In carrying out the aforementioned thermal processing reaction, it was found that the benzene insoluble material forms rapidly by reason of oxygen being present in the reaction. After a softening point of approximately 150° F. has been reached, the increase in benzene insoluble material is found to be approximately linear, with the increase in softening point. The levels, thus obtained, are found to be higher as the reaction temperature increases from 500° F. to approximately 750° F. Between about 750° F. and about 775° F., the benzene insoluble content levels off. When carrying out the thermal processing at temperatures from about 750° F. to about 780° F., a 20% to 30% benzene insoluble level is reached for products having a softening point of about 230° F.

Concomitant with the observations with respect to the specific gravity of the feed stock material, it is found that the Conradson carbon value increases as the reaction temperature increases. Values within the same range as those normally obtained for satisfactory binder pitches are obtained when the processing temperature is at least about 700° F. and higher.

The viscosity of the binder pitch produced in accordance with the thermal processing reaction of the present invention, is found to be somewhat higher than that obtained for thermal asphalts having the same softening points. Thus, it is found that the highest viscosity levels are obtained when the processing temperature is maintained at about 700° F. or lower. No significant shift in the viscosity level is observed with respect to small changes in the operating temperature conditions when maintained at the level between about 750° F. and about 780° F. Insofar as residence time is concerned, it is found that this factor is dependent upon both the processing temperature and the quantity of oxygen consumed. Thus, at any given temperature, the required residence time will depend upon the oxygen consumption rate. As the temperature is increased, the oxygen requirement is decreased.

Polymerizations at above-atmospheric pressures require a higher residence time than polymerization at atmospheric pressure or below. Insofar as the source of oxygen is concerned for use in the above-described thermal processing polymerization, any source may be employed which makes available free oxygen for such purpose. Thus, the source of oxygen may comprise, most conveniently, air, or free oxygen and also various materials which have the ability to liberate oxygen during the processing operation, for example, organic and inorganic peroxides.

The final manufacturing step is a steam stripping operation for removal of light ends to meet flash point specifications.

Apparatus suitable for carrying out the above-described polymerization or blowing operation preferably comprises a still of sufficient height to permit high air rates and liquid depths, sufficient disengaging space and reduced tendency of the charge stock to by-pass into the product. In such apparatus a baffle arrangement is contemplated in the blowing section having the structure shown in cross-section, in the single figure of the accompanying drawing.

As shown in the drawing, oil charge stock is introduced into the blowing section 10 of still 12 through oil inlet conduit 14. Air is introduced into the blowing section 10 through conduit 16. Section 10 is provided with cylindrical baffle 18, and a turbo 20, actuated by a rotor 22, coupled to drive shaft 24 of motor 26.

In section 10 reaction occurs between oil stock charge stock introduced through conduit 14 and air introduced through conduit 16 at the bottom of the blowing section 10 with turbo 20 in operation. Reaction occurs only in the smaller diameter section 18 with the reaction product over-flowing and being withdrawn at a lower portion of the section through outlet conduit 28. In such arrangement, highly improved binder pitch is obtained by reason of the baffle functioning in setting up a circulation pattern in the reactor which promotes the disengaging of spent air from the liquid and also in preventing the oil charge stock from "short circuiting" and passing out with the product through conduit 28.

DESCRIPTION OF SPECIFIC EMBODIMENTS

The following examples and data are intended to illustrate the preparation of the improved asphaltic compositions of the present invention and their properties as well as the highly significant improvement in binder pitch yields and quality when polymerization is carried out at the above-described conditions.

Example 1

A feed stock was first prepared by cracking a cycle stock, obtained from fractionation of the effluent from fluid catalytic cracking operation, and subjecting the portion of the resultant vis-broken cycle stock boiling above about 550° F. to fractionation to provide a bottoms fraction boiling above 750° F.

TABLE I.—DISTILLATION OF VIS-BROKEN CYCLE OIL

|  | Full range oil | Topped oil (750° F. plus) |
|---|---|---|
| Yield, volume percent bottoms | 100.0 | 66.2 |
| Properties of bottoms: |  |  |
| Specific gravity, 77/77 | 1.040 | 1.154 |
| Viscosity at 210° F., cs | 16 | 245 |
| Flash, COC, ° F | 340 | 495 |
| Infrared index: |  |  |
| $I_A$ | 0.24 |  |
| $I_T$ | 0.54 |  |
| Ratio | 3.65 |  |
| Vacuum distillation: |  |  |
| IBP | 447 | 721 |
| 5% | 516 | 761 |
| 10% | 629 | 776 |
| 20% | 701 | 794 |
| 30% |  | 813 |
| 40% |  | 835 |
| 50% | 791 | 861 |
| 60% |  | 894 |
| 70% |  | 943 |
| 80% | 927 |  |
| 90% |  |  |
| Sulfur, weight percent | 1.20 | 1.11 |
| Carbon, weight percent | 90.46 | 92.40 |
| Hydrogen, weight percent | 7.32 | 7.00 |
| Elution chromatography, weight percent: |  |  |
| Saturates | 8.6 | 4.2 |
| Mono and dinuclear aromatic oils | 3.0 | 1.0 |
| Polynuclear aromatic oil | 28.1 | 20.4 |
| Soft resins | 28.4 | 38.1 |
| Hard resins | 11.7 | 13.8 |
| Eluted asphaltenes | 11.4 | 15.4 |
| Non-eluted asphaltenes | 8.8 | 7.1 |
| Pour point, ° F | 55 | 115 |
| Softening point, ° F |  | 108 |
| Conradson carbon, percent | 12.5 | 18.6 |
| Bureau of mines correlation index [1] | 134 | 157 |

[1] BMCI=48,640/K plus 473.7 G–456.8; where K=mid boiling point vapor temperature in degrees Kelvin; and G=specific gravity at 15.6/15.6° C. (Technical Paper 610, U.S. Bureau of Mines, 1940, H. M. Smith).

Samples of the above described (750° F.+) cycle oil of Table I were next subjected to a continuous air-blowing treatment under the conditions disclosed in the following Table II. The overall improvement in the binder pitch quality and yield will be apparent from the comparative results set forth in the table.

TABLE II.—CONTINUOUS BLOWING OF 750° F. PLUS CYCLE OIL

|  | 2,000 grams/hour feed | | | 4,000 grams/hour feed | | | | |
| --- | --- | --- | --- | --- | --- | --- | --- | --- |
| Run number | 1 | 2 | 3 | 4 | 5 | 6 | 7 | 8 |
| Operating conditions: | | | | | | | | |
| Blow time to grade, hours | 10 | | | 8 | | 10 | | |
| Blow time at grade, hours | 4 | 8 | 12 | 4 | 8 | 4 | 8 | 12 |
| Holdup time, hours | 2 | 2 | 2 | 1 | 1 | 1 | 1 | 1 |
| Holdup weight, grams | 4,000 | 4,000 | 4,000 | 4,000 | 4,000 | 3,800 | 3,800 | 3,800 |
| Temperature, °F | 775 | 775 | 775 | 775 | 775 | 800 | 800 | 800 |
| Feed rate, grams/hour | 1,980 | 1,980 | 1,980 | 4,000 | 4,000 | 3,800 | 3,800 | 3,800 |
| Air rate, s.c.f.m./bbl | 6.3 | 6.3 | 6.3 | 10.5 | 10.5 | 11.7 | 11.7 | 11.7 |
| Calculated air speed, ft./minutes | 0.69 | 0.69 | 0.69 | 1.16 | 1.16 | 1.29 | 1.29 | 1.29 |
| Pressure, p.s.i.g. | 0 | 0 | 0 | 0 | 0 | 8 | 8 | 8 |
| Yields, weight percent: | | | | | | | | |
| Gas and water loss | | | 0 | | 14.8 | | | 0.14 |
| Overhead oil | | | 16.1 | | 18.6 | | | 22.0 |
| Pitch | | | 82.0 | | 66.4 | | | 77.0 |
| Scrapings | | | 1.9 | | 0.2 | | | 0.86 |
| Scrapings, insolubles in quinoline | | | 1.05 | | 0.12 | | | 0.51 |
| Gas composition, weight percent: | | | | | | | | |
| Hydrocarbons $C_1$-$C_5$ | | | 9.8 | 3.5 | 4.0 | | | 5.3 |
| Nitrogen and argon | | | 88.5 | 90.7 | 84.8 | | | 89.1 |
| CO | | | 0 | 0.4 | 0.3 | | | 3.9 |
| $CO_2$ | | | 0.2 | 0.9 | 0.7 | | | 0.5 |
| $O_2$ | | | 1.5 | 4.5 | 10.2 | | | 1.2 |
| Overhead oil properties: | | | | | | | | |
| Gravity, °API | | | 6.1 | 1.09 | 0.2 | | | 2.6 |
| Viscosity at 100° F., cs | | | 21.72 | 427 | 147 | | | 57.96 |
| Distillation, IBP | | | 323 | 465 | 420 | | | 388 |
| 10% over | | | 553 | 724 | 691 | | | 695 |
| 90% over | | | 793 | 853 | 835 | | | 919 |
| Pitch properties: | | | | | | | | |
| Softening point, R&B, °F | 223 | 222 | 218 | 236 | 231 | 234 | 222 | 208 |
| Specific gravity, 77/77 | 1.2329 | 1.2337 | 1.2311 | 1.2280 | 1.2313 | 1.2349 | 1.2289 | 1.2263 |
| Benzene insolubles | 27.74 | 26.60 | 24.10 | 25.16 | 25.95 | 27.36 | 23.81 | 23.83 |
| Quinoline insolubles | 6.05 | 6.18 | 4.82 | 4.03 | 5.86 | 5.26 | | |
| Flash point, COC, °F | 570 | 500 | 480 | 485 | 460 | 525 | 575 | 490 |
| Conradson carbon residue, percent | 42.5 | 42.6 | 42.2 | 44.2 | 42.4 | 43.8 | 42.1 | 40.7 |
| Viscosity at 350° F., cs | 865 | 877 | 645 | 1590 | 1100 | 1090 | 600 | 488 |
| Penetration, 180/100/5 | 68 | 64 | 76 | 28 | 43 | 39 | 64 | 71 |
| Coking rate, grams/hour | | | 20.7 | | 5 | | | 19.4 |
| Time to reach 1,000 grams of coke, hours | | | 48 | | 200 | | | 52 |
| Ratio of total pitch to still capacity | | | 20 | | 133 | | | 38 |
| Yield based on full range of CBO | | | 53.6 | | 43 | | | 50 |

Example 2

A slurry oil, in the form of a relatively high boiling fraction obtained as a bottoms product from distillation of a synthetic crude oil from a fluid catalytic cracking operation and having catalyst fines removed therefrom, was subjected to vacuum distillation, similar to the procedure described in Example 1. The clarified slurry oil (CSO) relatively high boiling fraction thus obtained, boiling above 750° F. and comprising about 67%, by weight, of the original full-range product, was employed as a feed stock for air-blowing and was found to have the following characteristics as compared with the full-range product.

TABLE III.—DISTILLATION OF CLARIFIED SLURRY OIL

|  | Full range CSO | Topped CSO |
| --- | --- | --- |
| Yield, vol. percent bottoms | | 67.0 |
| Properties CSO 69 | 3,843 | 3,842 |
| Specific gravity, 77/77 | 1.069 | 1.1009 |
| Viscosity at 130° F., cs | 149.6 | |
| Viscosity at 210° F., cs | 11.8 | 38.4 |
| Flash, COC, °F | 320 | 475 |
| Infrared index: | | |
| $I_A$ | 0.18 | 0.22 |
| $I_T$ | 0.47 | 0.47 |
| Ratio | 4.04 | 4.19 |
| Vacuum distillation: | | |
| IBP | 502 | 724 |
| 5% | 615 | 768 |
| 10% | 676 | 786 |
| 20% | 719 | 805 |
| 30% | 747 | 814 |
| 40% | 759 | 824 |
| 50% | 786 | 841 |
| 60% | 803 | 862 |
| 70% | 832 | 882 |
| 80% | 876 | 927 |
| 90% | 933 | 1,019 |
| Sulfur, wt. percent | | 0.92 |
| Carbon, wt. percent | 90.03 | 90.53 |
| Hydrogen, wt. percent | 8.01 | 7.77 |
| Elution chromatography, wt. percent | | |
| Saturates | 17.1 | 13.3 |
| Mono and dinuclear aromatic oils | 4.3 | 2.5 |
| Polynuclear aromatic oil | 27.2 | 25.1 |
| Soft resins | 25.4 | 31.4 |
| Hard resins | 9.3 | 11.7 |
| Eluted asphaltenes | 9.3 | 13.4 |
| Non-eluted asphaltenes | 7.4 | 2.6 |
| Nuclear magnetic resonance: | | |
| Aromatics condensed | 22.8 | 25.2 |
| Aromatics uncondensed | 6.6 | 6.7 |
| $CH_2$, CH, alpha to aromatic | 18.5 | 21.4 |
| $CH_3$ alpha to aromatic | 10.7 | 10.1 |
| Naphthalene | 7.5 | 6.8 |
| Methylene | 19.7 | 17.4 |
| Methyl | 14.2 | 12.6 |
| Aniline point mixed | | 112.5 |
| Pour point, °F | | |
| Bureau of Mines Correlation Index [1] | | 122 |

[1] $BMCI = \frac{48640}{K} + 473.7 \, G - 456.8$ where K=mid boiling point vapor temperature in degrees Kelvin and G=specific gravity at 15.6/15.6° C.) (Technical Paper 610, U.S. Bureau of Mines, 1940, H. M. Smith).

Samples of the above described (750° F. +) clarified slurry oil of Table III were next subjected to a continuous air-blowing treatment under the conditions disclosed in the following Table IV. The overall improvement in binder pitch quality and yield will be apparent from the following comparative results set forth in the table.

TABLE IV.—CONTINUOUS BLOWING OF 750° F.+ CLARIFIED SLURRY OIL

|  | 0 p.s.i.g. 2,000 gm./hr. feed | 0 p.s.i.g. 4,000 gm./hr. feed | 10 p.s.i.g. 2,000 gm./hr. feed |
| --- | --- | --- | --- |
| Operating conditions: | | | |
| Blow time to grade, hrs | 7.5 | 4 | 4.5 |
| Blow time on grade, hrs | 8.0 | 18 | 24 |
| Holdup time, hrs | 1.9 | 1.0 | 1.88 |
| Holdup weight, gm | 4,000 | 4,000 | 4,000 |
| Temperature, °F | 775 | 775 | 775 |
| Feed rate, gm./hr | 2,300 | 4,000 | 2,070 |
| Air rate, s.c.f.m./bbl | 7.5 | 12.3 | 12 |
| Calculated air speed, ft./min | 0.82 | 1.35 | 1.32 |
| Pressure, p.s.i.g. | 0 | 0 | 10 |
| Yields, wt. percent: | | | |
| Gas, water and loss | 9.64 | 7.3 | 3.0 |
| Overhead oil | 18.7 | 28.0 | 13.0 |
| Pitch | 70.0 | 64.3 | 81.74 |
| Scrapings | 1.66 | 0.4 | 2.26 |
| Scrapings, insolubles in quinoline | 0.76 | 0.18 | 0.71 |

TABLE IV.—Continued

|  | 0 p.s.i.g. 2,000 gm./hr. feed | 0 p.s.i.g. 4,000 gm./hr. feed | 10 p.s.i.g. 2,000 gm./hr. feed |
|---|---|---|---|
| Gas composition, wt. percent: |  |  |  |
| Hydrocarbons, $C_1$-$C_5$ | 8.3 | 2.8 | 7.1 |
| Nitrogen and argon | 88.7 | 91.7 | 90.4 |
| CO | 0.8 | 0.9 | 0.8 |
| $CO_2$ | 0.9 | 0.9 | 0.6 |
| $O_2$ | 1.3 | 3.7 | 1.1 |
| Ovrhead oil properties: |  |  |  |
| Gravity, °API | 7.7 | 4.0 | 11.1 |
| Viscosity at 100° F., cs | 47.39 | 175 | 24 |
| Distillation: |  |  |  |
| IBP | 376 | 414 | 336 |
| 10% | 5,581 |  |  |
| 90% | 802 |  |  |
| Pitch properties: |  |  |  |
| Softening point, R&B, ° F | 227 | 229 | 231 |
| Specific gravity, 77/77 | 1,2198 | 1,2182 | 1,2153 |
| Benzene insolubles, wt. percent | 26.90 | 24.31 | 30.0 |
| Quinoline insolubles, percent | 5.64 | 3.18 | 6.18 |
| Flash point, COC, ° F | 530 | 475 | 440 |
| Conradson carbon residue, percent | 41.6 | 40.6 | 41.2 |
| Viscosity at 350° F, cs | 1,070 | 840 | 1,230 |
| Penetration, 180/100/5 | 61 | 63 | 58 |
| Coking rate, gm./hr | 17.5 | 7.0 | 14.7 |
| Time to reach 1,000 gm. of coke, hrs. | 57 | 143 | 68 |
| Ratio total pitch to still capacity | 23 | 91 | 35 |
| Yield pitch based on full range CSO | 46 | 43 | 55 |

Suitability of feed stocks for the production of satisfactory binder pitch has been found to be associated with low saturates content, low mono-, di- and polynuclear aromatic oil contents and high total resins content. Topping of the charge stock has been found to minimize coke formation in the air-blowing operation, reduction of vapor load in the blowing still and to have no significant affect on pitch yield.

Thermal treatment (vis-breaking) of relatively heavy catalytic stocks has been found necessary to insure the production of uniform quality feed stocks having desirable low saturates contents. Relatively high boiling fractions from catalytic cracking operations, containing from about 6 to about 10%, by weight, of saturates, after vis-breaking, have been found to comprise suitable feed stocks for satisfactory electrode binder manufacture. On the other hand, it has been found that the yield and quality of binder pitch obtained as high boiling fractions from catalytic cracking operations which were not vis-broken were poor in quality with respect to their intended purpose.

The quality of binder pitch produced in accordance with the novel process of the present invention is evaluated by conventional industry tests, functional tests indicating pitch handling qualities and potential electrode characteristics and compositional tests, such as gradient elution chromatography and nuclear magnetic resonance. Satisfactory quality standards for electrode binders are characterized as follows:

Softening point, ° F. ---------------- 230.
Specific gravity (77/77°)[1] ---------- 1.235 (min.)
Viscosity, cs. at 350° F.[1] ---------- 650 (max.).
Quinoline insolubles, percent wt. ----- 4 (max.).
Coke/binder equilibrium ratio, gms. coke/cc. binder --------------- 1.5 (min.).
Relative crystallinity, percent ------- 75 (min.).
Heat Hardening Test, 5 hrs. 485° F.:
   Loss, wt. percent ----------------- 4 (max.).
   Softening point increase, ° F. ----- 20 (max.).
   Coke and sludge ------------------- Moderate
Nuclear magnetic resonance:
   Analysis, percent H on aromatic rings  50 (min.).
   $CH_3$ gamma to arom. ring --------- 2 (max.).

[1] At 230° F. soft point.

Heretofore, undesirable coke formation in the air-blowing operation, in accordance with the process of the present invention, has not constituted a significant problem. In this respect it was found that coking can be limited by minimizing boiling points, within the aforementioned operating temperature range, and also by vis-breaking the original heavy catalytic feed stocks to low saturates content and thereafter topping.

The relatively high temperature process of the present invention, under the specified conditions hereinbefore discussed, for the production of electrode binder pitch, suitable for use in the manufacture of carbon electrodes, contemplates the use of relatively high boiling fractions obtained from either a Thermofor or fluid catalytic cracking operation. Because of the relatively high air rates employed, the entire liquid mass is in violent turbulence and the composition of the liquid throughout the reactor is essentially homogeneous from the bottom to the top of the unit at any particular instance. It shuld be noted, however, that it is possible to employ a multistage operation, within the scope of the present process, by passing the material through a series of reactors.

The major reaction is the polymerization effect of the oxygen in the air. At elevated temperature, the so-called "oxidation" reaction is not one of oxidation, but primarily a dehydrogenation reaction. Hence, only a relatively small amount of oxygen combines with the material being processed. The portion of the feed stock which reacts strongly with the oxygen is the fraction identified by chromatographic separation as the soft polynuclear aromatic resins. This forms a major part, for example, 60%, by weight or higher, of the feed stock and constitutes an essential ingredient.

The ultimate evaluation test of electrode binder quality is expressed by its performance in the reduction cell. Thus, as previously indicated various tests and evaluations are specifically applicable for this purpose. Hence, it is found that materials, such as binder pitch do not have a melting point but gradually soften with increasing temperature. The softening point—Ring and Ball Test, ASTM D–36, is used to determine the grade of binder to be made. For commercial purposes, three grades of binder pitch are normally employed by the aluminum industry, viz 200° F., 220° F. and 230° F. softening points. The specific gravity (77/77) constitutes one of the critical properties of electrode binder pitch. Thus, it is found that the higher the specific gravity, usually corrected to 230° F. soft point, the more likely the binder will perform satisfactorily in the anode. A minimum satisfactory value of 1.235 (corrected to 230° F. soft point) has been established for such binders.

One of the basic properties of electrode binder pitch is the viscosity at mixing temperatures (325–350° F.) in preparing mixes with coke. For such purposes a maximum viscosity of 650 centistokes at 350° F. is considered satisfactory. Another significant test is the coke/binder equilibrium test (grams coke/cc. of binder) for measuring the degree in which the binder will wet coke. In this respect, poor wettability of the coke by the binder comprises one of the causes of high electrical resistivity in the finished anode. A minimum value of 1.5 grams coke/cc. binder is considered satisfactory for the production of electrode binder pitch.

Another significant test for binder pitch evaluation comprises a heat-hardening test. In this test, by holding a sample of the binder at 485° F. for five hours, certain observations can be made which have a bearing on the performance of the binder. One of these factors is the weight loss of the sample in the heat-hardening test, which gives an indication of the loss encountered in baking the anode. In this respect a weight loss of 4% is considered as being indicative of an electrode binder which will not have a high baking loss. Another factor is that electrode binders with otherwise good performance records in actual plant operation show a low soft point increase in the heat-hardening test. Thus, binders blown from a wide variety of cycle oil derived stocks can increase from about 8 to about 11° F. in soft point, during the test. In this respect a limit of 20° F. soft point increase has been set for binders to be produced commercially. Another significant factor in binder pitch production is the fact that samples of asphalt which develop relatively large amounts of coke and sludge during the test are not stable in hot storage. Thus, deposits can accumulate on the heating surfaces in tanks and tank cars blocking the outlet valves. In essence, therefore, while the formation of coke on heating might not be considered a highly significant factor in the use of a pitch as an electrode binder, such formation would nevertheless be objectionable if it were to result in plugging of lines or valves in the storage or shipment of liquid binders. Thus, it is highly desirable that a binder intended for commercial use produce a minimum amount of coke or sludge in the heat-hardening test.

A finished anode, as employed in the reduction cell in the manufacture of aluminum, is comprised of coke aggregate particles bonded by the coke formed from the binder pitch. In this respect from about 8 to about 18% of the coke in the anode will come from the binder pitch. The coke aggregate is usually calcined petroleum coke obtained for the most part, from delayed cokers and the binder presently employed comprises coal tar pitch. During the baking of the anode, the binder pitch is converted to coke and serves to bond the aggregate.

In prior art studies it was found that because the coke from coal tar pitch is more reactive than petroleum coke, it is selectively oxidized in the cell thus removing the bonding and permitting the loss of some of the coke aggregate. In this connection it has been demonstrated that the degree of crystallinity of the coke from binder pitch possesses a lower degree of crystallinity than the petroleum coke aggregate and is selectively oxidized from the anode.

In contrast to coke made from coal tar pitch, cokes from petroleum base binders, possess a higher degree of crystallinity, thereby reducing the selective oxidation of the bonding coke with its attendant loss of coke aggregate, thus establishing a higher significant improvement in the electrode binder pitch of the present invention.

The type of hydrogen present in the carbon disulfide soluble fractions of electrode binders is determined, as recited in the aforementioned data, by NMR (nuclear magnetic resonance) analysis. This test contemplates four types of hydrogen, viz aromatic hydrogen; hydrogen on the saturated carbon alpha to the aromatic rings; hydrogen in all other CH and $CH_2$ groups and in the $CH_3$ groups beta to an aromatic ring; and all other methyl groups, gamma, delta, etc., to an aromatic ring, the latter also including hydrogen in methyl groups on saturated hydrocarbon molecules. Inasmuch as highly condensed aromatic ring molecules constitute a considerable portion of electrode binders and are considered desirable for good binder quality, the determination of hydrogen in aromatic rings is a valuable measurement for rating binders. In this regard, a minimum of 50% aromatic hydrogen in the carbon disulfide soluble portion of the binder is considered as a quality limit.

Illustratively, the air-blowing process of the present invention makes possible the production of a satisfactory carbon electrode binder pitch of 230° F. soft point, in which the pitch possesses a specific gravity in excess of 1.2; from 0 to 2% methyl groups (NMR); a coke/binder equilibrium of 1.5 minimum; a satisfactory heat-hardening test in which the weight loss is 4% maximum, the soft point increase is 20° F. maximum and the quantity of coke laydown is only slight or moderate; 8% maximum weight distillation at 850° F.; and a specific gravity-viscosity relationship, in which the binder exhibits both a relatively high specific gravity and a relatively low specific viscosity. Insofar as the Bureau of Mines Correlation Index (BMCI) is concerned, feed stocks having a relatively high index e.g. about 120 or higher, are particularly desirable.

From the foregoing data and disclosure, it will be apparent that the present invention makes possible the production of improved asphaltic compositions, and in increased yields, by the polymerization treatment of relatively high boiling oil fractions derived from catalytic cracking operations, and which possess wide utility in the manufacture of molded carbonaceous articles, as well as for other uses in which asphaltic materials are normally required. In combination with major quantities of carbon particles, the asphaltic compositions of the present invention are particularly useful as binders, for example, in the manufacture of improved carbon electrodes possessing the hereinbefore-described outstanding properties. Other uses for these asphaltic compositions reside in underground water-proofing, for example, as paper pipe saturant, or as fiber-board binders, as well as in other products where a high aromatic-content asphalt or pitch is required. These asphaltic materials may also be employed as primary or secondary plasticizers, in various applications. It will also be noted that other asphaltic charge stocks of the type herein disclosed may also be similarly treated in accordance with the present invention to produce the novel improved, desired asphaltic compositions.

Although the present invention has been described with preferred embodiments, it will be understood that various modifications and adaptations thereof may be resorted to, without departing from the spirit and scope of the invention, as those skilled in the art will readily appreciate.

I claim:

1. In a process for conversion to pitch suited to use as binder for electrode coke of high boiling components from the catalytic cracking of gas oil at temperatures above 750° F. in the presence of a solid porous cracking catalyst, the steps which comprise:
   (A) fractionating the effluent of such cracking to separate therefrom a cycle stock boiling predominately above about 550° F.;
   (B) cracking said cycle stock at elevated temperature in the absence of cracking catalyst for a time such that the portion of the resultant vis-broken cycle stock boiling above 750° F. shall have a saturates content not higher than about 12%, by weight, as determined by chromatographic analysis;
   (C) fractionating the vis-broken cycle stock to provide a bottoms fraction thereof boiling above 700° F. to 850° F.;
   (D) continuously feeding said bottoms fraction to a continuous blowing operation maintained at about 750° F. to 850° F.;
   (E) introducing air to a lower portion of the liquid subjected to said blowing operation at a rate from about 6 to about 30 standard cubic feet of air per minute per barrel of liquid and;
   (F) continuously withdrawing blown pitch from said continuous blowing operation at a rate to maintain an average residence time of liquid therein less than one hour.

2. A process as defined in claim 1 wherein said air-blowing operation is carried out at a rate of from about 10 to about 20 standard cubic feet of air per minute per barrel of liquid.

3. A process as defined in claim 1 wherein said air-blowing operation is carried out at a temperature from about 750° F. to about 800° F.

4. A process as defined in claim 1 wherein said air-blowing operation is carried at a pressure from about 0 to about 15 p.s.i.g.

5. A process as defined in claim 1 wherein said blown pitch is continuously withdrawn from said continuous blowing operation at an average residence time of liquid therein for a period from about 15 to about 30 minutes.

6. A process as defined in claim 1 wherein the bottoms fraction fed to said blowing operation has a specific gravity of from about 1.08 to about 1.16.

7. A process as defined in claim 1 wherein said blown pitch is subsequently subjected to steam distillation to strip light ends therefrom.

8. In a process for conversion to pitch suited to use as binder for electrode coke of high boiling components from the catalytic cracking of gas oil at temperatures above 750° F. in the presence of a solid porous cracking catalyst, the steps which comprise:
  (A) fractionating the effluent of such cracking to separate therefrom a cycle stock boiling predominately above about 550° F. and containing a fraction boiling above 750° F. having a saturates content not higher than about 12%, by weight, as determined by chromatographic analysis;
  (B) fractionating the cycle stock to provide a bottoms fraction thereof boiling above 700° F. to 850° F.;
  (C) continuously feeding said bottoms fraction to a continuous blowing operation maintained at about 750° F. to 850° F.;
  (D) introducing air to a lower portion of the liquid subjected to said blowing operation at a rate from about 6 to about 30 standard cubic feet of air per minute per barrel of liquid; and
  (E) continuously withdrawing blown pitch from said continuous blowing operation at a rate to maintain an average residence time of liquid therein less than one hour.

References Cited

UNITED STATES PATENTS

| | | | |
|---|---|---|---|
| 2,767,102 | 10/1956 | Edson | 106—281 |
| 3,238,116 | 3/1966 | Hamner et al. | 208—6 |
| 3,510,328 | 5/1970 | Crean | 106—273 |
| 3,350,295 | 12/1965 | Hamner et al. | 208—4 |

FOREIGN PATENTS

| | | | |
|---|---|---|---|
| 1,135,096 | 11/1968 | Great Britain | 106—273 |

OTHER REFERENCES

"Asphalt Science & Technology," Barth, pp. 400–409, Gordon & Breach, Publishers, New York (1962).

DELBERT E. GANTZ, Primary Examiner

G. E. SCHMITKONS, Assistant Examiner

U.S. Cl. X.R.

208—4, 22, 40, 67, 73, 76